United States Patent
Brutsche

(10) Patent No.: US 11,851,127 B2
(45) Date of Patent: Dec. 26, 2023

(54) STEERING DEVICE FOR A TILTING VEHICLE, AND TILTING VEHICLE HAVING SUCH A STEERING DEVICE

(71) Applicant: Bayerische Motoren Werke Aktiengesellschaft, Munich (DE)

(72) Inventor: Maximilian Brutsche, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/792,211

(22) PCT Filed: Feb. 1, 2021

(86) PCT No.: PCT/EP2021/052237
§ 371 (c)(1),
(2) Date: Jul. 12, 2022

(87) PCT Pub. No.: WO2021/197683
PCT Pub. Date: Oct. 7, 2021

(65) Prior Publication Data
US 2023/0051551 A1    Feb. 16, 2023

(30) Foreign Application Priority Data
Mar. 31, 2020   (DE) .................. 10 2020 108 820

(51) Int. Cl.
*B62K 23/02* (2006.01)
*B62K 21/26* (2006.01)
(Continued)

(52) U.S. Cl.
CPC ............... *B62K 23/04* (2013.01); *B62J 33/00* (2013.01); *B62K 21/26* (2013.01)

(58) Field of Classification Search
CPC ........ B62K 11/14; B62K 21/16; B62K 23/02; B62K 23/04; B62J 33/00
See application file for complete search history.

(56) References Cited

U.S. PATENT DOCUMENTS 2,788,676 A * 4/1957 Spexarth .................. G05G 1/08
74/489
5,626,780 A * 5/1997 Ogata .................... B62K 21/26
219/535
(Continued)

FOREIGN PATENT DOCUMENTS

CN          204775762 U      11/2015
DE           29705389 U1 *    5/1997   ............. B62K 23/04
(Continued)

OTHER PUBLICATIONS

International Search Report (PCT/ISA/210) issued in PCT Application No. PCT/EP2021/052237 dated Apr. 14, 2021 with English translation (seven (7) pages).
(Continued)

*Primary Examiner* — Adam D Rogers
(74) *Attorney, Agent, or Firm* — Crowell & Moring LLP

(57) ABSTRACT

A steering device for a tilting vehicle is provided having at least one handlebar which includes at least one gripping portion, with at least one receiving element which is fixed or fixable, releasably or non-releasably, on the gripping portion for fixing a gripping element, and with at least one gripping element which covers the receiving element from the outside and which is either directly fixed or fixable non-releasably, in particular adhered or molded, on the gripping portion or is directly fixed or fixable releasably, in particular clipped or screwed, on the receiving element.

10 Claims, 2 Drawing Sheets

(51) Int. Cl.
*B62J 33/00* (2006.01)
*B62K 23/04* (2006.01)

(56) References Cited

U.S. PATENT DOCUMENTS

| | | | | |
|---|---|---|---|---|
| 6,035,742 | A * | 3/2000 | Hollingsworth | B62K 23/06 |
| | | | | 74/551.8 |
| 6,042,132 | A * | 3/2000 | Suenaga | B62M 25/04 |
| | | | | 74/551.8 |
| 6,263,759 | B1 * | 7/2001 | Hollingsworth | B62K 21/26 |
| | | | | 74/551.9 |
| 8,291,887 | B2 * | 10/2012 | Nozoe | B62K 11/14 |
| | | | | 123/399 |
| 8,402,664 | B1 * | 3/2013 | Kitamura | B62K 23/04 |
| | | | | 33/1 PT |
| 10,787,220 | B2 * | 9/2020 | Moeschler | B62K 21/12 |
| 2009/0158884 | A1 * | 6/2009 | Kuo | B62K 21/26 |
| | | | | 74/551.9 |

FOREIGN PATENT DOCUMENTS

| | | | |
|---|---|---|---|
| DE | 202 07 483 U1 | | 7/2002 |
| DE | 102006046342 A1 * | | 4/2008 ............. B62J 33/00 |
| DE | 20 2008 011 887 U1 | | 1/2009 |
| EP | 0 759 393 A1 | | 2/1997 |
| EP | 1 350 715 A2 | | 10/2003 |
| EP | 2 586 693 A1 | | 5/2013 |
| EP | 3 147 194 A1 | | 3/2017 |
| KR | 10-2008-0077484 A | | 8/2008 |
| NL | 1026246 C2 | | 11/2005 |
| WO | WO 2010/025619 A1 | | 3/2010 |

OTHER PUBLICATIONS

German-language Written Opinion (PCT/ISA/237) issued in PCT Application No. PCT/EP2021/052237 dated Apr. 14, 2021 (three (3) pages).

German-language Search Report issued in German Application No. 10 2020 108 820.5 dated Nov. 18, 2022 with partial English translation (11 pages).

English translation of Chinese-language Office Action issued in Chinese Application No. 202180008350.0 dated Sep. 5, 2023 (9 pages).

* cited by examiner

STEERING DEVICE FOR A TILTING VEHICLE, AND TILTING VEHICLE HAVING SUCH A STEERING DEVICE

BACKGROUND AND SUMMARY

The invention relates to a handlebar device for a tilting vehicle and a tilting vehicle having such a handlebar device.

Handlebar devices for tilting vehicles are known in which gripping elements are non-releasably secured to a gripping portion. Particularly when the gripping portion comprises a throttle twist grip, forces can thereby be transmitted in a particularly effective manner.

In the known handlebar devices, the gripping elements are applied and non-releasably secured to the gripping portion by means of injection-molding. As a result of the securing by means of injection-molding, the gripping elements cannot be removed from the gripping portion again without being destroyed or damaged themselves. Replacement of gripping elements, for example, after a gripping element has been damaged or as a result of an existing specific client request, has thereby been found to be laborious. In such cases, the gripping element which has been injected onto the gripping portion has to be cut from the gripping portion and a new gripping element has to be pushed onto the gripping portion and adhesively bonded at that location, which has been found to be complex and laborious.

An object of the embodiment of the invention is to provide a handlebar device for a tilting vehicle and a tilting vehicle having such a handlebar device in which an arrangement of a new gripping element after removal of a gripping element which was previously arranged on the gripping portion is simplified.

This object is achieved with a handlebar device for a tilting vehicle having at least one handlebar which comprises at least one gripping portion, having at least one receiving element which can be secured or is secured in a releasable or non-releasable manner to the gripping portion in order to secure a gripping element, and having at least one gripping element which extends over the receiving element from the outer side and which either can be secured or is secured, in particular adhesively bonded or injected, directly onto the gripping portion in a non-releasable manner or which can be secured or is secured directly onto the receiving element in a releasable manner, in particular clip-fitted or screwed.

By providing a receiving element on the gripping portion, a securing of a replaceable releasable gripping element is enabled. The gripping element can thereby be replaced in a simple manner in the event of damage or a specific customer request.

The receiving element is also available when a non-releasable gripping element, for example, as a result of series production methods, is injected directly onto the gripping portion. In such cases, the gripping element also extends over the receiving element. If the non-releasable gripping element is subsequently released, for example, by cutting open and/or milling off the gripping portion, in such cases a releasable and replaceable new gripping element can be applied to the gripping portion and can be releasably secured via the receiving element.

As a result of the receiving element, a simple possibility is thereby afforded of securing a new gripping element to the gripping portion when a non-releasable gripping element has been removed in a complex manner.

A tilting vehicle is intended to be understood to be bicycles, motorcycles or motorcycle-like motor vehicles, such as motor scooters, in particular two-, three- or four-wheeled motor scooters, scooters, tiltable trikes, quad bikes or the like.

The receiving element may be secured to the gripping portion at any location of the gripping portion as long as it performs the function of the gripping element being able to be releasably secured to the receiving element. In this instance, it is found to be advantageous for the receiving element to be secured to the gripping portion in or on a region of the gripping portion which is facing away from the free end of the gripping portion, and/or for the receiving element to be secured on a stop element of the handlebar which delimits the gripping portion indirectly or directly in abutment against the gripping portion and/or the stop element.

The stop element may comprise a component of the handlebar device which directly adjoins the gripping portion and which comprises a greater extent when viewed transversely relative to the longitudinal direction of the handlebar than the gripping portion.

In an embodiment of the handlebar device, there is provision for the receiving element to comprise at least one bush-shaped receiving element which comprises a recess, wherein the recess extends transversely or obliquely with respect to the longitudinal extent direction of the gripping portion.

By providing a recess, the gripping element can be secured to the receiving element in a simple manner by means of any rear fastener.

In order to prevent the bush-shaped receiving element, during series production of the handlebar device, from being filled with material of the gripping element as a result of a gripping element being injected on, it is found to be advantageous for the handlebar device to comprise at least one closure element which can be releasably arranged in or on the bush-shaped receiving element and by means of which an accessibility of the recess from the outer side can be closed and/or for at least the recess to comprise an inner threaded portion and for the fastener to comprise an, in particular complementary, outer threaded portion which corresponds to the inner threaded portion of the recess.

By providing the closure element which can be releasably arranged in the receiving element, a penetration of dirt or injection-molding material during the formation of the gripping element can be prevented.

By arranging an inner threaded portion in the recess, the receiving element is constructed to receive, for example, a bolt-type fastener.

Furthermore, in an embodiment of the handlebar device there is provision for the gripping element to be able to be pushed in a joining direction onto the gripping portion, for the gripping element in the arrangement joined onto the gripping portion to comprise at the side facing away from the free end of the gripping portion at least one opening which is in alignment with the recess of the receiving element in the joined arrangement, wherein through the opening and recess a securing element for forming a rear grip with respect to the joining direction of the gripping element can be arranged and/or for the gripping element to comprise in the arrangement joined to the gripping portion at the side facing away from the free end of the gripping portion at least one projection which is pretensioned in the direction of the gripping portion and which in the joined arrangement can engage in the recess so as to form a rear grip with respect to the joining direction.

As a result of the fact that the gripping element can be pushed onto the gripping portion in a joining direction, the gripping element can completely surround the gripping portion transversely relative to the joining direction.

If the gripping element comprises the at least one opening which is in alignment with the recess of the receiving element in the joined arrangement, in such cases the fastener can be introduced both through the recess and through the opening and a rear grip with respect to the joining direction can be produced. When the gripping element comprises a projection which is pretensioned in the direction of the gripping portion, the gripping element when it reaches the joined arrangement can engage in the recess so as to form a rear grip with respect to the joining direction.

In principle, it is contemplated for the receiving element to surround the gripping portion only over a portion. In one embodiment of the handlebar device, there is provision for the receiving element to be constructed in an annular manner and to completely or at least partially surround the gripping portion at the circumference.

In such cases, the receiving element can be pushed onto the receiving portion and can be secured in a releasable or non-releasable manner. As a result of the fact that the receiving element is constructed in an annular manner, it can be easily positioned in a non-releasable manner during assembly in such cases.

The receiving element may comprise only a single receiving element. The transmission of forces by the gripping element to the receiving element can be improved when the receiving element comprises at least three receiving elements which have the same or in each case a different spacing with respect to each other.

When the at least three receiving elements have the same spacing with respect to each other, the gripping element can be arranged in different positions on the gripping portion. When the at least three receiving elements have different spacings with respect to each other in each case, the gripping element can be arranged only in one position. This is found to be particularly advantageous when the gripping element has an ergonomic shape which necessarily has to be arranged in a specific position or when the gripping element comprises, for example, a logo which, as a result of the provision of a visually appealing external appearance, is intended to be arranged in a specific orientated position.

The positioning and orientation of the gripping element on the gripping portion can alternatively or additionally to the above-mentioned embodiment also be ensured in that the receiving element comprises at least one positioning element on which the gripping element can be fitted during joining in the joining direction before reaching the joined arrangement with at least one recess which is constructed in a corresponding, in particular in a complementary manner and which extends in the joining direction.

In such cases, the gripping element must initially be pieced together with the positioning element before the joined arrangement is reached in order to be able to be moved further into the joined arrangement. In such cases, the gripping element must be rotated where applicable about an axis which extends through the gripping portion.

It is further contemplated for the gripping element or the receiving element to comprise a slotted guiding member which automatically rotates the gripping element into a specific arrangement when the gripping element is moved in the joining direction.

Furthermore, another embodiment of the handlebar device comprises at least one heating element which can be arranged or is arranged on the gripping portion and by means of which the gripping element can be heated and/or at least one protection device which can be secured or is secured extensively on the circumference of the gripping portion and which in the joined arrangement is arranged between the gripping portion and the gripping element.

The protection device may, for example, comprise a metal or a carbon-fiber-reinforced plastics material. By providing a protection device, a gripping element which is arranged in a non-releasable manner on the gripping portion can be removed, whereby the risk of damage to the heating element as a result of the protection device is reduced. Furthermore, by providing a protection device, a new gripping element can be arranged on the gripping portion in a simple manner without there being any risk of damage to the heating element when the gripping element is pushed onto the gripping portion.

Furthermore, embodiments of the handlebar device are provided in which one and the same gripping element can be arranged both on the left and on the right on the handlebar of the tilting vehicle.

Finally, the objective is achieved by a tilting vehicle having at least one handlebar device which has at least one of the features mentioned above and which comprises at least one handlebar which comprises at least one gripping portion, the at least one receiving element which can be secured or is secured to the gripping portion in a releasable or non-releasable manner for securing a gripping element and the at least one gripping element which extends over the receiving element from the outer side and which can either be secured or is secured directly to the gripping portion in a non-releasable manner, in particular adhesively bonded or injected on, or which can be secured or is secured directly onto the receiving element in a releasable manner, in particular clip-fitted or screwed.

Other features, details and advantages of the invention will be appreciated from the appended patent claims, from the drawings and the following description of a preferred embodiment of the handlebar device.

DETAILED DESCRIPTION OF THE DRAWINGS

Figure 1:
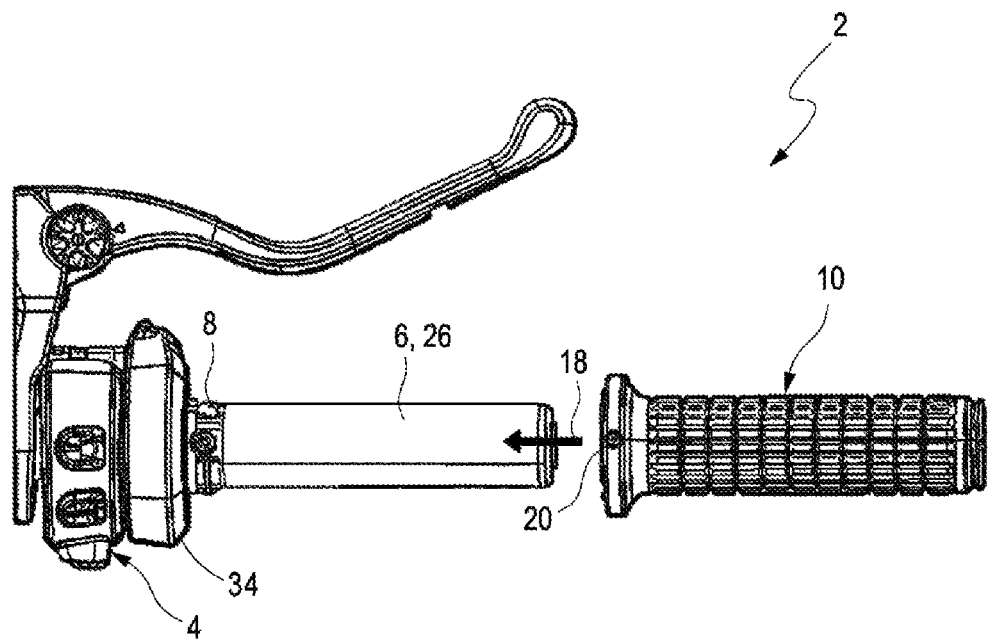
FIG. 1 is a plan view of an embodiment of the handlebar device having a gripping element which can be releasably replaced.
Figure 2:
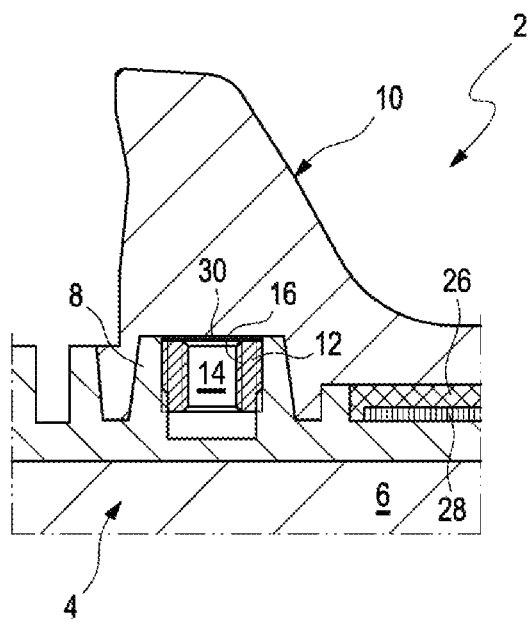
FIG. 2 is a sectioned detailed view of the embodiment according to FIG. 1 with a non-releasably secured gripping element.

The figures show a handlebar device, which is generally designated for a tilting vehicle (not explicitly illustrated in the Figures). The handlebar device 2 comprises a handlebar 4, which comprises at least one gripping portion 6. At least one receiving means 8 is secured to the gripping portion 6 in a releasable or non-releasable manner adjacent to stop element 34. Furthermore, the handlebar device 2 comprises a gripping element 10. The gripping element 10 extends over the receiving means 8 from the outer side. FIG. 2 shows a sectioned view in which the gripping element 10 is secured to the gripping portion 6 in a non-releasable manner, in particular in which the gripping element 10 is injected onto the gripping portion 6.

Figure 3:
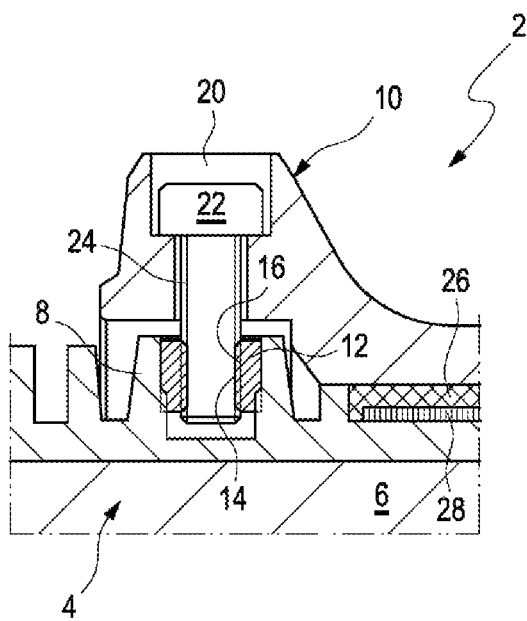
FIG. 3 is a sectioned detailed view of the embodiment according to FIG. 1 with a releasably secured gripping element.

FIG. 3 shows an embodiment of the gripping element 10 which is pushed in a releasable manner onto the gripping portion 6 and which is secured to the receiving element 8 in a releasable manner.

In the embodiment shown in the figures, the receiving element 8 is secured to a region of the gripping portion 6 which faces away from the free end of the gripping portion 6. In the embodiment which can be seen in the figures, the receiving element 8 comprises three bush-shaped receiving elements 12 which each comprise a recess 14 in which an inner threaded portion 16 is arranged.

The gripping element 10 is constructed in such a manner that it can be pushed in a joining direction 18 onto the gripping portion 6. The gripping element 10 comprises at the side facing away from the free end of the gripping portion 6 three openings 20 which are constructed in a corresponding, in particular complementary, manner to the recesses 14 of the bush-shaped receiving element 12. In order to secure the gripping element 10 to the gripping portion 6, fasteners 22 can be inserted through the opening 20 in the gripping element 10 and secured to an outer threaded portion 24 in the inner threaded portion 16 of the recess 14.

The figures show one embodiment of the handlebar device 2 in which the receiving element 8 is constructed in an annular manner and completely surrounds the gripping portion 6 at the circumference.

Furthermore, the handlebar device 2 comprises a heating element 28 which is arranged on the gripping portion 6. The heating element is completely surrounded by a protection layer 26 which is secured extensively to the circumference of the gripping portion 6 and which is arranged, in the joined arrangement between the gripping portion 6 and the gripping element 10.

FIG. 2 shows the handlebar device 2 in which a gripping element 10 which is non-releasably secured to the gripping portion 6 is provided. This element can be arranged on the gripping portion 6 by means of injection-molding. In order to prevent material of the gripping element 10 from being introduced into the recess 14 of the bush-shaped receiving element 12 of the receiving element 8, there is provided a closure 30 by means of which an accessibility of the recess 14 from the outer side can be closed.

FIG. 3 shows a detailed sectioned view, in which the non-releasable gripping element 10 has been removed by destroying the gripping element 10 and a replaceable, releasably securable gripping element 10 has been pushed on.

Figure 4:
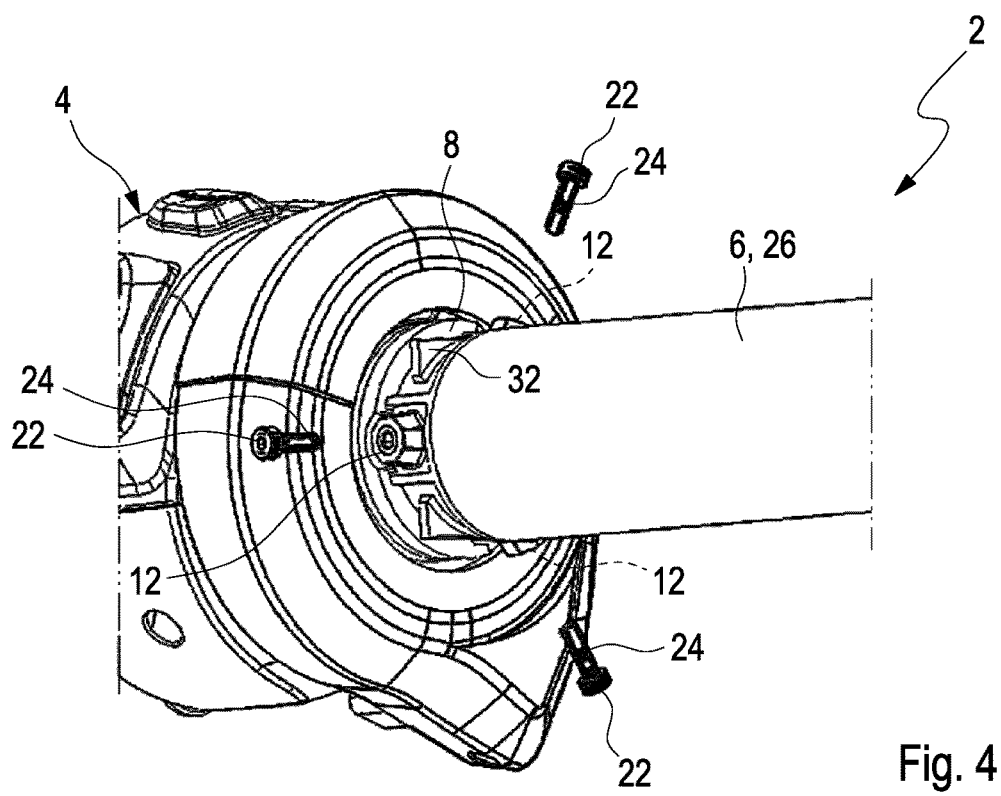
FIG. 4 is a perspective front view of the handlebar device according to FIG. 1 without a gripping element.
Figure 5:
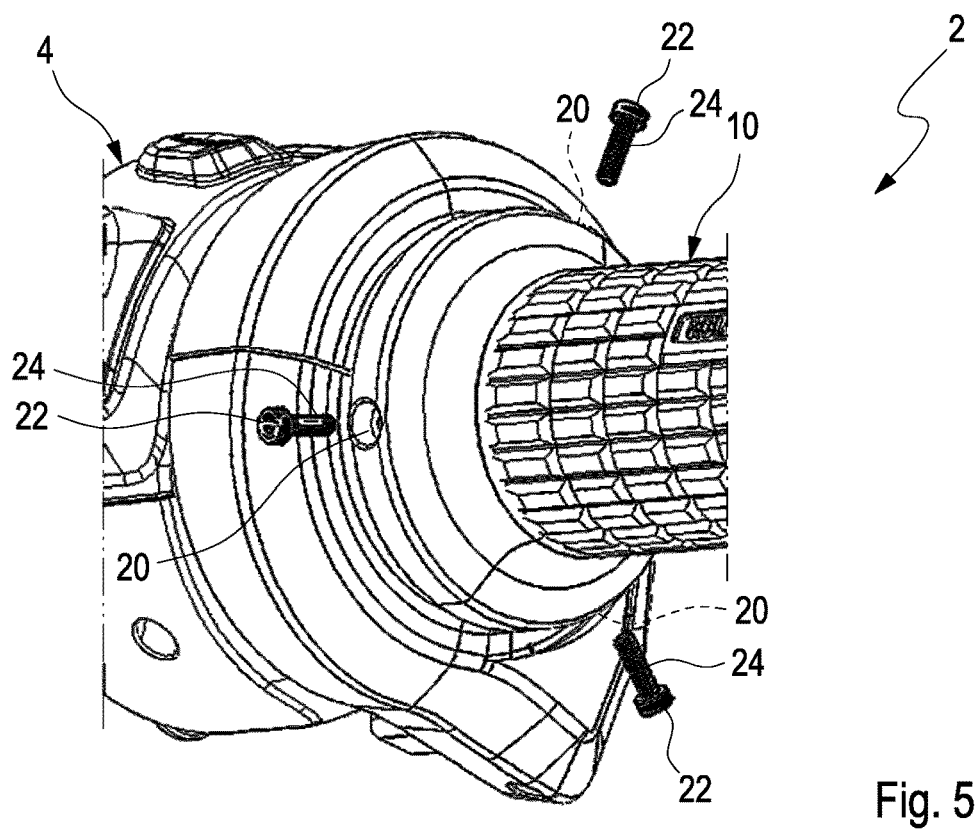
FIG. 5 is a perspective front view of the handlebar device according to FIG. 1 with a gripping element.

In order to ensure a positioning of the gripping element 10 in a specific position, it can be seen in FIG. 4 that there may be provided a positioning element 32 on which the gripping element 10 during joining in the joining direction 18 before reaching the joined arrangement can be fitted with at least one recess which is constructed in a corresponding manner and which extends in a joining direction 18.

The features of the invention disclosed in the above description, in the claims and in the drawings may be significant both individually and also in any combination in the implementation of the invention in its various embodiments.

LIST OF REFERENCE NUMERALS

2 Handlebar device
4 Handlebar
6 Gripping portion
8 Receiving means
10 Gripping element
12 Receiving element
14 Recess
16 Inner threaded portion
18 Joining direction
20 Opening
22 Securing means
24 Outer threaded portion
26 Protection means
28 Heating element
30 Closure means
32 Positioning element
34 Stop element

What is claimed is:

1. A handlebar device for a tilting vehicle, comprising:
at least one handlebar having at least one gripping portion;
at least one receiving member which can be secured or is secured in a releasable or non-releasable manner to the gripping portion, the at least one receiving member including at least one receiving element which has a recess extending transversely or obliquely with respect to a longitudinal extent direction of the gripping portion;
at least one gripping element which extends over the at least one receiving member from an outer side and which either can be secured or is secured directly onto the gripping portion in a non-releasable manner or which can be secured or is secured directly onto the at least one receiving member in a releasable manner; and
the handlebar device further comprising:
a closure which can be releasably arranged in or on the at least one receiving member and by which an accessibility of the recess from the outer side can be closed, and/or
at least the recess comprises an inner threaded portion and a fastener comprises an outer threaded portion which corresponds to the inner threaded portion of the recess.

2. The handlebar device according to claim 1, wherein
at least one receiving member is secured to the gripping portion in or on a region of the gripping portion which faces away from a free end of the gripping portion, and/or
at least one receiving member is secured on a stop element of the handlebar which delimits the gripping portion indirectly or directly in abutment against the gripping portion and/or the stop element.

3. The handlebar device according to claim 1, wherein
the at least one receiving member is constructed in an annular manner and completely or at least partially surrounds a circumference of the gripping portion.

4. The handlebar device according to claim 1, wherein
the at least one receiving element comprises at least three receiving elements which have the same or in each case a different spacing with respect to each other.

5. The handlebar device according to claim 1, further comprising:
at least one heating element which is arranged on the gripping portion and by which the gripping element is heated, and/or
at least one protection device which is secured extensively on the circumference of the gripping portion and which, in a joined arrangement, is arranged between the gripping portion and the gripping element.

6. The handlebar device according to claim 1, wherein the gripping element is secured non-releasably to the gripping portion via adhesive bonding or injection molding.

7. The handlebar device according to claim 1, wherein the gripping element is secured releasably to the at least one receiving member via a clip-fit or threaded connection.

8. A tilting vehicle, comprising:

a handlebar having at least one gripping portion, at least one receiving member which is secured to the gripping portion in a releasable or non-releasable manner, the at least one receiving member including at least one receiving element which has a recess which extends transversely or obliquely with respect to a longitudinal extent direction of the gripping portion, a gripping element which extends over the at least one receiving member from an outer side and which is secured directly to the gripping portion in a non-releasable manner or is secured directly onto the at least one receiving member in a releasable manner, and a closure which can be releasably arranged in or on the at least one receiving member and by which an accessibility of the recess from the outer side can be closed and/or at least the recess comprises an inner threaded portion and a fastener comprises an outer threaded portion which corresponds to the inner threaded portion of the recess.

9. A tilting vehicle, comprising:

a handlebar having at least one gripping portion, at least one receiving member which is secured to the gripping portion in a releasable or non-releasable manner, a gripping element which extends over the at least one receiving member from the outer side and which is secured directly to the gripping portion in a non-releasable manner or is secured directly onto the at least one receiving member in a releasable manner, wherein the at least one receiving member comprises at least one receiving element which comprises a recess, the recess extends transversely or obliquely with respect to a longitudinal extent direction of the gripping portion, the gripping element is pushed in a joining direction onto the gripping portion, the gripping element, in a joined arrangement on the gripping portion, comprises at a side facing away from a free end of the gripping portion, at least one opening which is in alignment with the recess of the receiving element in the joined arrangement, and through the opening and recess, a fastener for forming a connection with respect to the joining direction of the gripping element can be arranged, and/or the gripping element comprises, in the joined arrangement on the gripping portion at the side facing away from the free end of the gripping portion, at least one projection which is pretensioned in the direction of the gripping portion and which, in the joined arrangement, can engage in the recess so as to form the connection with respect to the joining direction.

10. A handlebar device for a tilting vehicle, comprising:

at least one handlebar having at least one gripping portion;

at least one receiving member which can be secured or is secured in a releasable or non-releasable manner to the gripping portion; and at least one gripping element which extends over the at least one receiving member from an outer side and which either can be secured or is secured directly onto the gripping portion in a non-releasable manner or which can be secured or is secured directly onto the at least one receiving member in a releasable manner, wherein the at least one receiving member comprises at least one receiving element which comprises a recess, the recess extends transversely or obliquely with respect to a longitudinal extent direction of the gripping portion, the gripping element is pushed in a joining direction onto the gripping portion, the gripping element, in a joined arrangement on the gripping portion, comprises at a side facing away from a free end of the gripping portion, at least one opening which is in alignment with the recess of the receiving element in the joined arrangement, and through the opening and recess, a fastener for forming a connection with respect to the joining direction of the gripping element can be arranged, and/or the gripping element comprises, in the joined arrangement on the gripping portion at the side facing away from the free end of the gripping portion, at least one projection which is pretensioned in the direction of the gripping portion and which, in the joined arrangement, can engage in the recess so as to form the connection with respect to the joining direction.

\* \* \* \* \*